United States Patent
Watanabe

[19]

[11] Patent Number: 6,002,835
[45] Date of Patent: Dec. 14, 1999

[54] METHOD OF RECORDING AND REPRODUCING REDUCED IMAGE DATA CORRELATED WITH ORIGINAL IMAGE DATA

[75] Inventor: Mikio Watanabe, Asaka, Japan

[73] Assignee: Fuji Photo Film Co., Ltd., Kanagawa, Japan

[21] Appl. No.: 08/666,822

[22] Filed: Jun. 19, 1996

[30] Foreign Application Priority Data

Jun. 23, 1995 [JP] Japan ..................................... 7-179703

[51] Int. Cl.$^6$ ....................................................... H04N 5/76
[52] U.S. Cl. ............................................. 386/95; 386/109
[58] Field of Search ................................ 386/1, 6, 33, 45, 386/69–70, 81–82, 95, 108, 125–126, 109, 111–112; 348/231–233; 358/906, 909.1; 360/72.1, 72.2; H04N 5/92, 5/781, 5/783

[56] References Cited

U.S. PATENT DOCUMENTS

| | | | |
|---|---|---|---|
| 5,027,214 | 6/1991 | Fujimori | 386/112 |
| 5,276,841 | 1/1994 | Moronaga et al. | |
| 5,384,674 | 1/1995 | Nishida et al. | 386/96 |
| 5,543,925 | 8/1996 | Timmermans | 386/45 |
| 5,594,598 | 1/1997 | Shikakura | 386/109 |
| 5,613,032 | 3/1997 | Cruz et al. | 386/112 |
| 5,640,601 | 6/1997 | Peters | 386/112 |
| 5,699,203 | 12/1997 | Arai et al. | 386/112 |

Primary Examiner—Thai Tran

[57] ABSTRACT

Reduced images are obtained when image data are reproduced and kept at a uniform size while image data representing original images and image data representing reduced images are recorded on a recording medium efficiently. When image data are recorded on a memory card having a recording capacity of less than 50 megabytes, the original-image data are subsampled at a prescribed subsampling ratio to obtain reduced-image data. The reduced-image data and data representing the numbers of pixels of the reduced image in the horizontal and vertical directions thereof are recorded in the header area of the memory card. At playback, the reduced-image data and the numbers of pixels of the reduced image in the horizontal and vertical directions recorded on the memory card are read from the memory card. On the basis of the data representing the numbers of pixels of the reduced image in its horizontal and vertical directions, interpolation processing or subsampling processing is applied to the reduced-image data in such a manner that the reduced image takes on a fixed size. When the reduced-image data that have been subjected to the interpolation or subsampling processing are applied to a display unit, the reduced image having the fixed size is displayed in prompt fashion.

5 Claims, 5 Drawing Sheets

METHOD OF RECORDING AND REPRODUCING REDUCED IMAGE DATA CORRELATED WITH ORIGINAL IMAGE DATA

BACKGROUND OF THE INVENTION

1. Field of the Invention

This invention relates to an image data recording/reproducing method for recording original-image data representing an original image and reduced-image data representing a reduced image of the original image on a recording medium such as a memory card or magneto-optical disk, and for reading and outputting the reduced-image data from the recording medium on which the data has been recorded. The invention further relates to an image data recording apparatus and method as well as an image data reproducing apparatus, which are suited to the above-mentioned image data recording/reproducing method.

2. Description of the Prior Art

When original-image data representing an original image are recorded on a recording medium such as a memory card or magneto-optical disk, it has been contemplated to record reduced-image data representing a reduced image of the original image on the recording medium. If the recorded data are data representing a reduced image, the amount of image data is also small. As a result, quick readout is possible and the reduced image can be reproduced quickly as well. Reproducing the reduced image makes it possible to ascertain the content of the original image, which can be reproduced as necessary. The general practice is to generate the reduced-image data by subsampling the original-image data.

Since it is necessary to make the sizes of reduced images uniform, the quantity of reduced-image data is made uniform regardless of the coarseness or fineness of the original image and the quantity of original-image data. In order to make the quantity of reduced-image data uniform, consideration has been given to changing the subsampling ratio in dependence upon the quantity of original-image data. However, when the subsampling ratio is changed image by image in dependence upon the quantity of original-image data for the purpose of uniformalizing the quantity of reduced-image data, the smaller the quantity of original-image data, the larger the ratio of the quantity of reduced-image data to the quantity of original-image data. Accordingly, the quantity of original-image data capable of being recorded diminishes as a result of recording the reduced-image data. For example, consider a case where original-image data are recorded on a recording medium upon being subjected to data compression at a compression ratio of ⅛. If the size of a reduced image is 80 pixels horizontally and 64 pixels vertically, then the quantity of reduced-image data will be five kilobytes. In this case, for original-image data representing an original image having 1280 pixels horizontally and 1024 pixels vertically, the quantity of data recorded on the recording medium will be 160 kilobytes. For original-image data representing an original image having 640 pixels horizontally and 512 pixels vertically, the quantity of data recorded on the recording medium will be 41 kilobytes.

Regardless of the quantity of original-image data to be recorded on the recording medium, the quantity of reduced-image data is fixed. The smaller the quantity of original-image data, the more the difference between the quantity of original-image data and the quantity of reduced-image data diminishes and the smaller the advantage of recording the reduced-image data on the recording medium together with the original-image data becomes. These problems become particularly conspicuous if the recording medium is one having a small recording capacity.

Furthermore, if the area for recording the reduced-image data on the recording medium is not decided in advance, all recording areas must be searched when a reduced image is to be reproduced. As a result, reduced images cannot be reproduced in rapid fashion.

SUMMARY OF THE INVENTION

An object of the present invention is to arrange it so that when original-image data representing an original image and reduced-image data representing a reduced image of the original image are recorded on a recording medium, recording can be carried out efficiently and it is possible to obtain a reduced image having a predetermined size.

Another object of the invention is to make it possible to reproduce reduced images at high speed.

According to a first embodiment of the present invention, the foregoing objects are attained by providing an apparatus for recording image data on a recording medium having an image-data recording area and an image-data management information area, the apparatus comprising first recording control means for recording original-image data, which represent an original image, in the image-data recording area of the recording medium, and second recording control means for recording data representing a reduced image of the original image in the image-data management information recording area of the recording medium in correlation with the original-image data that have been recorded in the image-data recording area.

The first embodiment provides a method of recording image data as well. Specifically, according to the first invention, there is provided a method of recording image data on a recording medium having an image-data recording area and an image-data management information area, the method comprising the steps of recording original-image data, which represent an original image, in the image-data recording area of the recording medium, and recording data representing a reduced image of the original image in the image-data management information recording area of the recording medium in correlation with the original-image data that have been recorded in the image-data recording area.

When the reduced-image data are recorded in a separate area as separate image data, it takes time to perform a search in order to determine where the reduced-image data are located on the recording medium. With the present invention, however, rapid reproduction of images is possible because the data representing the reduced-image data (namely the reduced-image data and data indicating the quantity of reduced-image data, and the like) are recorded in the image-data management information recording area.

A method of recording and reproducing image data according to the second embodiment of the present invention comprises the steps of generating, from original-image data representing an original image, reduced-image data representing a reduced image of the original image, wherein the reduced-image data are generated based upon a prescribed reduction ratio, recording the generated reduced-image data and the original-image data corresponding thereto on the recording medium in mutually correlated form, calculating the quantity of reduced-image data, recording data representing the calculated quantity of reduced-image data on the recording medium in correlation with the reduced-image data having this quantity of data, reading the data representing the quantity of reduced-image data and the reduced-image data from the recording medium in response to a reduced-image output command, adjusting the quantity of reduced-image data, on the basis of the data representing the quantity of reduced-image data, in such a manner that the reduced image will represent an image having a predetermined size, and outputting the reduced-image data the quantity whereof has been adjusted.

In accordance with the second embodiment of the present invention, the reduced-image data are generated based upon a prescribed reduction ratio. If the quantity of original-image data is large, the quantity of reduced-image data is large. Conversely, if the quantity of original-image data is small, then the quantity of reduced-image data also is small. Thus, the quantity of reduced-image data conforms to the quantity of original-image data and the reduced-image data can be recorded on the recording medium efficiently.

When the quantity of reduced-image data differs, the size of the reduced image also differs in conformity with the quantity of reduced-image data. In accordance with the present invention, however, data representing the quantity of reduced-image data also are recorded on the recording medium and the quantity of reduced-image data is adjusted, based upon the data representing the quantity of reduced-image data, in such a manner that the reduced image will represent an image having a predetermined size. Accordingly, the sizes of reduced images reproduced can be kept constant.

The second embodiment of the present invention also provides an image-data recording apparatus suited to the above-described method of recording and reproducing image data. Specifically, the invention provides an apparatus for recording image data, comprising reduced-image data generating means for generating, from original-image data representing an original image, reduced-image data representing a reduced image of the original image, wherein the reduced-image data are generated based upon a prescribed reduction ratio, first recording control means for recording the reduced-image data generated by the reduced-image data generating means and the original-image data on the recording medium in mutually correlated form, reduced-image data quantity calculating means for calculating the quantity of reduced-image data generated by the reduced-image data generating means, and second recording control means for recording data representing the quantity of reduced-image data, which has been calculated by the reduced-image data quantity calculating means, on the recording medium in correlation with the reduced-image data having this quantity of data.

The present invention, in a third embodiment, further provides a method of recording image data. Specifically, the method comprises the steps of generating, from original-image data representing an original image, reduced-image data representing a reduced image of the original image, wherein the reduced-image data are generated based upon a prescribed reduction ratio, recording the generated reduced-image data and the original-image data on the recording medium in mutually correlated form, calculating the quantity of reduced-image data generated, and recording data representing the calculated quantity of reduced-image data on the recording medium in correlation with the reduced-image data having this quantity of data.

In a preferred embodiment of this method of recording image data, the reduction ratio is made variable, the recording capacity of the recording medium is calculated, it is determined whether the calculated recording capacity is greater than a predetermined value and, in response to determination of the fact that the recording capacity is greater than the predetermined value, the reduction ratio is changed in such a manner that the reduced image takes on a predetermined size.

In a case where the recording capacity of the recording medium is large, recording of the original-image data can be sufficiently assured even if the quantity of reduced-image data is larger than the quantity of original-image data. To achieve this, the reduction ratio is changed in such a manner that the reduced image will take on a predetermined size when the recording capacity of the recording medium is judged to be greater than the predetermined value. As a result, reduced images can be maintained at a predetermined, constant size without adjusting the reduced-image data at the time of reduced-image playback.

The third embodiment of the present invention also provides an image-data reproducing apparatus suited to the above-described method of recording and reproducing image data. Specifically, the apparatus comprises readout means responsive to a reduced-image output command for reading reduced-image data and data representing the quantity of the reduced-image data from a recording medium on which original-image data representing an original image and the reduced-image data representing a reduced image of the original image have been recorded in mutually correlated form, the recording medium having the data representing the quantity of the reduced-image data recorded thereon, size determination means for determining, from the data representing the quantity of the reduced-image data read by the readout means, whether the reduced image represented by the reduced-image data has attained a predetermined size, first output control means for outputting the reduced-image data, which have been read by the readout means, in response to determination by the size determination means that the reduced image represented by the reduced-image data has attained the predetermined size, reduced-image data quantity adjusting means for adjusting the quantity of reduced-image data, which have been read by readout means, in such a manner that the reduced image represented by the reduced-image data will attain the predetermined size in response to determination by the size determination means that the reduced image represented by the reduced-image data has not attained the predetermined size, and second output control means for outputting the reduced-image data the quantity whereof has been adjusted by the reduced-image data quantity adjusting means The present invention, in a fourth embodiment, also provides a method of reproducing image data. Specifically, the method comprises the steps of reading, in response to a reduced-image output command, reduced-image data and data representing the quantity of the reduced-image data from a recording medium on which original-image data representing an original image and the reduced-image data representing a reduced image of the original image have been recorded in mutually correlated form, the recording medium having the data representing the quantity of the reduced-image data recorded thereon, determining, from the read data representing the quantity of the reduced-image data, whether the reduced image represented by the reduced-image data has attained a predetermined size, outputting the read reduced-image data in response to a determination that the reduced image represented by the reduced-image data has attained the predetermined size, adjusting the quantity of read reduced-image data in such a manner that the reduced image represented by the reduced-image data will attain the predetermined size in response to determination that the reduced image represented by the reduced-image data has not attained the predetermined size, and outputting the reduced-image data the quantity whereof has been adjusted.

When the reduced-image data and the data representing the quantity of reduced-image data have been recorded in the image-data management information recording area of the recording medium, the above-described readout processing reads out the reduced-image data and the data representing the quantity of the reduced-image data that have been stored in the image-data management information recording area.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENT

Figure 1:
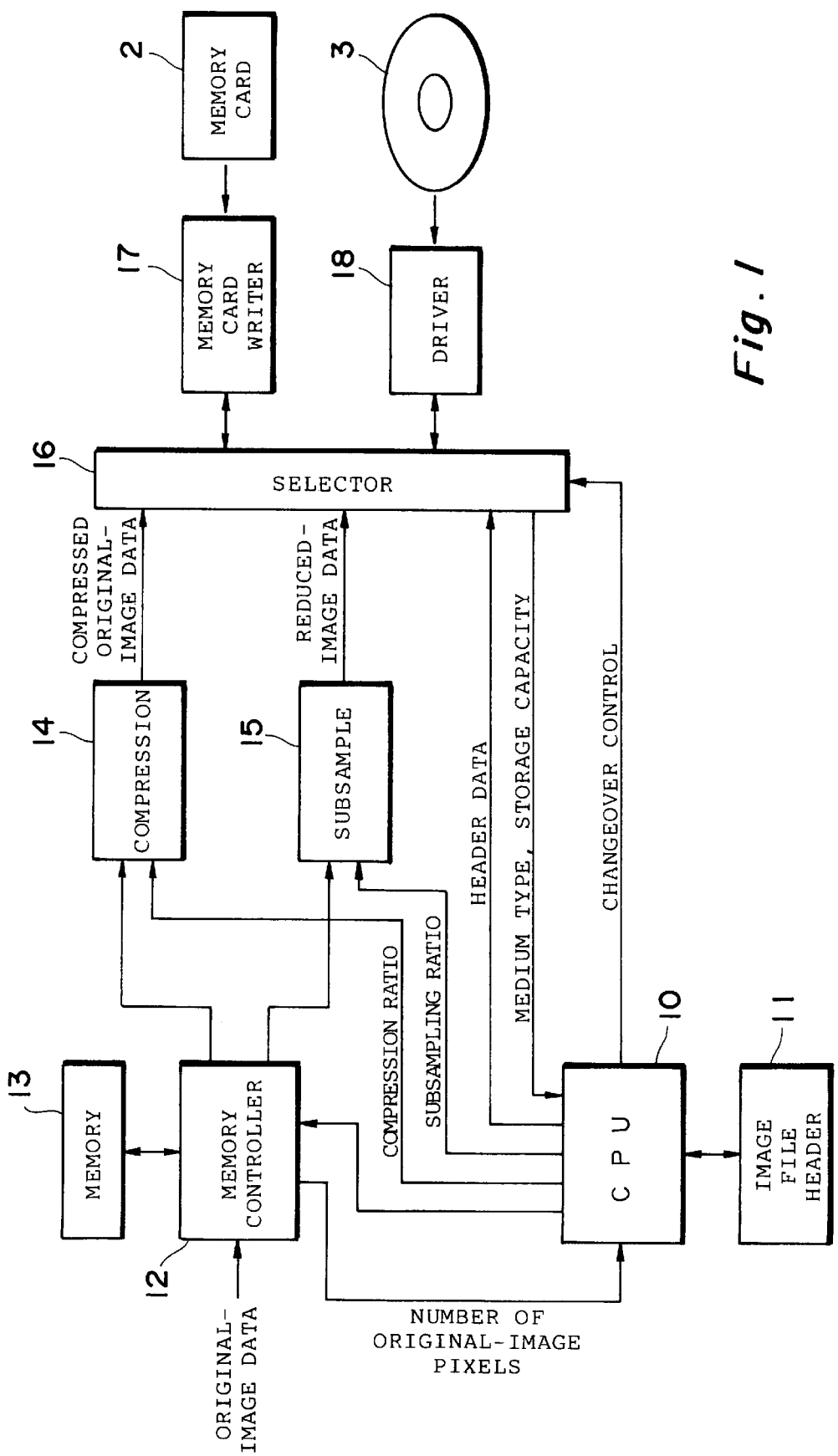
FIG. 1 is a block diagram illustrating the electrical configuration of an apparatus for recording image data.

FIG. 1 is a block diagram illustrating the electrical configuration of an apparatus for recording image data according to an embodiment of the present invention.

The apparatus for recording image data shown in FIG. 1 records original-image data representing high-definition original images on a recording medium (a memory card 2 or magneto-optical disk 3). In addition to these data, the apparatus is capable of storing reduced-image data representing reduced images of the original images on the recording medium. The overall operation of this image-data recording apparatus is supervised by a CPU 10.

Original-image data are supplied from outside the image-data recording apparatus and enter a memory controller 12. The original-image data are supplied from the memory controller 12 to a memory 13, where the data are temporarily stored.

The original-image data temporarily stored in the memory 13 are read out in blocks, each of which comprises eight pixels vertically and eight pixels horizontally, under the control of the memory controller 12, and the read data are applied to a data compression circuit 14. The original-image data are compressed in the data compression circuit 14 in accordance with a DCT (discrete cosine transform) algorithm and at a compression ratio provided by the CPU 10. The original-image data compressed by the data compression circuit 14 are applied to a selector 16.

The original-image data temporarily stored in the memory 13 are further read out under the control of the memory controller 12 and applied to a subsampling circuit 15. The latter generates reduced-image data from the original-image data in such a manner that a reduced image is generated. These reduced-image data are applied to the selector 16. The subsampling ratio in the subsampling circuit 15 is capable of being changed under the control of the CPU 10, and subsampling processing is performed at a subsampling ratio set under the control of the CPU 10.

Header data also are entered into the selector 16 from the CPU 10.

The compressed original-image data, reduced-image data or header data is selected by the selector 16 under the control of the CPU 10.

The image-data recording apparatus shown in FIG. 1 is capable of recording on the memory card 2 as well as on the magneto-optical disk 3. To accomplish this, the image-data recording apparatus is provided with a memory card writer 17 and a driver 18. When recording has been performed on the memory card 2, the compressed original-image data, reduced-image data and header data selected by the selector 16 are applied to the memory card writer 17. When recording has been performed on the magneto-optical disk 3, the compressed original-image data, reduced-image data and header data selected by the selector 16 are applied to the driver 18.

The type of recording medium (i.e., whether the recording medium is the memory card 2 or magneto-optical disk 3) and the recording capacity of the recording medium are capable of being detected in the image-data recording apparatus shown in FIG. 1. This detection is performed based upon information that has been recorded in an added information header in a manner described later.

Figure 2:
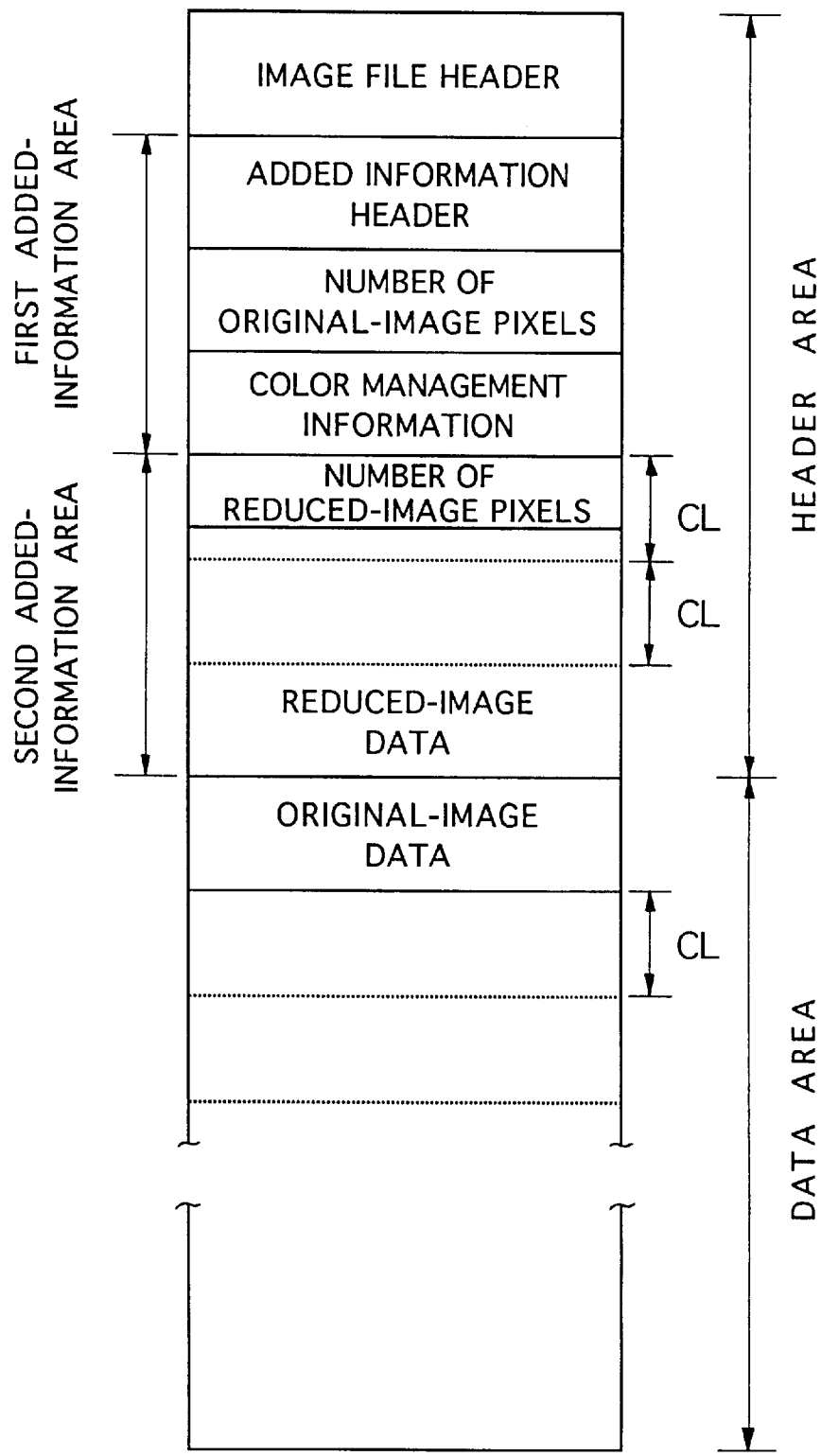
FIG. 2 is a diagram illustrating the architecture of data on a recording medium.

FIG. 2 is a diagram illustrating the architecture (file architecture) of data recorded on the memory card 2. The architecture of data recorded on the magneto-optical disk 3 is similar to that shown in FIG. 2.

This data recording architecture (logical sector array) is in accordance with a DOS-FAT (disk operating system—file allocation table) based file system. This DOS-FAT format is covered by the Personal Computer Memory Card International Association (PCMCIA) Standards and is currently capable of being read by almost all personal computers.

A file on a memory card is divided into a header area and a data area. The header area and data area are divided into a number of clusters (CL), and data are stored in cluster units. One cluster is composed of eight kilobytes. Each cluster is assigned a cluster number (omitted).

The header area comprises an image file header, a first added-information area and a second added-information area.

The image file header contains a header, a FAT (file allocation table) and a directory. Cluster size (=eight kilobytes) is recorded in the header. The chain of clusters in which one image file has been stored is described in the FAT. For example, if an original-image file has been stored in clusters 5, 6, 7 and 8, the chain of these clusters is described in the FAT. Even if one original-image file has been recorded in sporadic clusters and not in a plurality of consecutive clusters, all of the original-image data can be read out by tracing the chain of these clusters. Not only a chain of original-image data but also clusters in which reduced-image data have been recorded as described later are recorded in the FAT. Accordingly, all of the reduced-image data constructing one reduced image can be read out by referring to the FAT. For each item of original-image data recorded in the data area and the reduced-image data recorded in the header area, the name of the file, the file type, the file attribute, the file modification date and the initial cluster number are recorded in the directory.

The first added-information area comprises a recording area for the header of the added information (the type of recording medium and the recording capacity of the recording medium, etc.) and data representing the number of pixels in the original image, and a recording area for color management information (such as the values of parameters used in gamma processing and white-balance processing). The second added-information area comprises an area for recording the number of pixels (the number of pixels horizontally and the number of pixels vertically) of the reduced image and the reduced-image data.

Fixed information in the image file header is set beforehand in the memory 11 peripheral to the CPU 10. The information read out of the memory 11 by the CPU 10 is applied to the selector 16 as header data.

Figure 3:
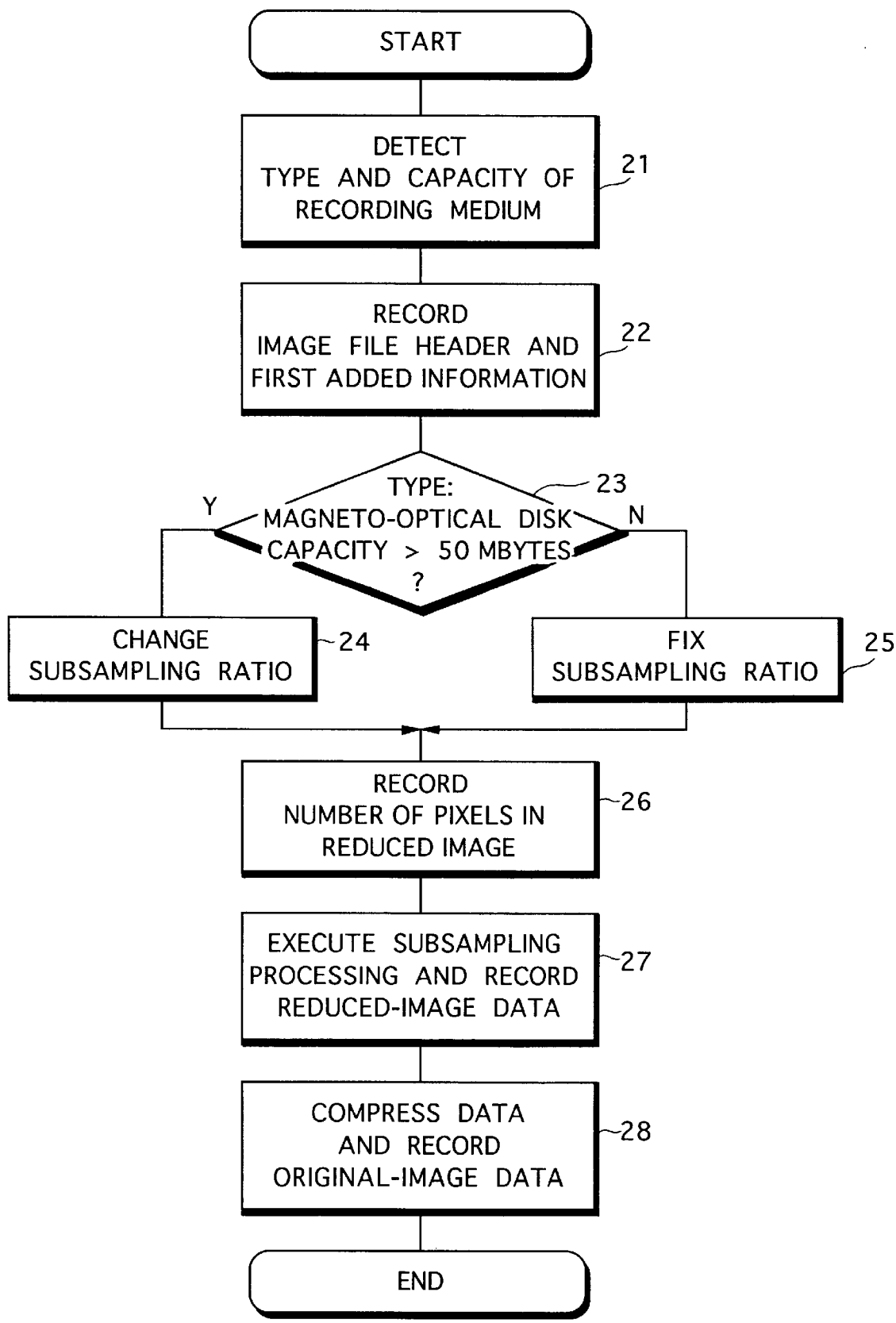
FIG. 3 is a flowchart illustrating the procedure of processing for recording image data.

FIG. 3 is a flowchart illustrating the procedure of processing for recording image data in the image-data recording apparatus shown in FIG. 1.

First, whether the recording medium loaded in the image-data recording apparatus is the memory card 2 or magneto-optical disk 3 is determined and the recording capacity of the medium is detected (step 21). Data representing the type of recording medium and the storage capacity are applied to the CPU 10.

Next, the data to be recorded in the image file header and in the first added-information area are outputted by the CPU 10 and applied to the recording medium (the memory card 2 or magneto-optical disk 3) via the selector 16, whereby the data are recorded (step 22). Whether the recording medium loaded in the image-data recording apparatus is the magneto-optical disk 3 or, if the recording medium is the memory card 2, whether the recording capacity thereof is greater than 50 megabytes, is judged (step 23) based upon the type and recording capacity of the recording medium detected at step 21.

In a case where the recording medium loaded in the image-data recording apparatus is not a magneto-optical disk and the storage capacity is equal to or less than 50 megabytes ("NO" at step 23), the subsampling circuit 15 is set in such a manner that a predetermined subsampling ratio is set (step 25). The storage capacity of the recording medium is small in this case. Consequently, if reduced-image data in addition to the original-image data are recorded on the recording medium, the ratio of the quantity of reduced-image data to the quantity of original-image data takes on a large value and the quantity of original-image data capable of being recorded is diminished by recording the reduced-image data. Thus, recording the reduced-image data hinders the recording of the original-image data. Therefore, in a case where a recording medium having little storage capacity has been loaded in the image-data recording apparatus shown in FIG. 1, the subsampling ratio is fixed (step 25) in such a manner that the processing for subsampling original-image data will be executed at a predetermined subsampling ratio. Since the subsampling ratio is fixed, the quantity of reduced-image data will be large if the quantity of original-image data is large and small if the quantity of original-image data is small. Thus, the quantity of reduced-image data conforms to the quantity of original-image data, and the reduced-image data can be recorded on the recording medium efficiently.

Conversely if the recording medium loaded in the image-data recording apparatus is an magneto-optical disk or the recording capacity is greater than 50 megabytes ("YES" at step 23), the effects upon the quantity of original-image data to be recorded will be small even if the ratio of the quantity of reduced-image data to the quantity of original-image data is large. Accordingly, a prescribed subsampling ratio is set by the CPU 10 in such a manner that the reduced image will take on a predetermined size (step 24).

Data representing the number of pixels in the reduced image are recorded in the second added-information area of the recording medium regardless of whether the subsampling ratio is changed (step 26). The number of pixels constituting the reduced image can be calculated from the number of pixels in the original image supplied by the memory controller 12 and the subsampling ratio set in the subsampling circuit 15. For example, if the original image consists of about 1,300,000 pixels, namely 1280 pixels horizontally and 1024 pixels vertically, and the subsampling ratio is made ⅛ in both the horizontal and vertical directions, then the number of pixels in the reduced image will be 1,300,000 pixels×1/64=about 20,000 pixels.

When data representing the number of pixels in the reduced-image data are recorded on the recording medium, subsampling processing is executed with regard to the original-image data in the subsampling circuit 15, whereby reduced-image data are obtained. The reduced-image data thus obtained are recorded in the second added-information area of the recording medium (step 27). Further, the original-image data are subjected to data compression in the data compression circuit 14 and the compressed original-image data are recorded in the data area of the recording medium (step 28).

Figure 4:
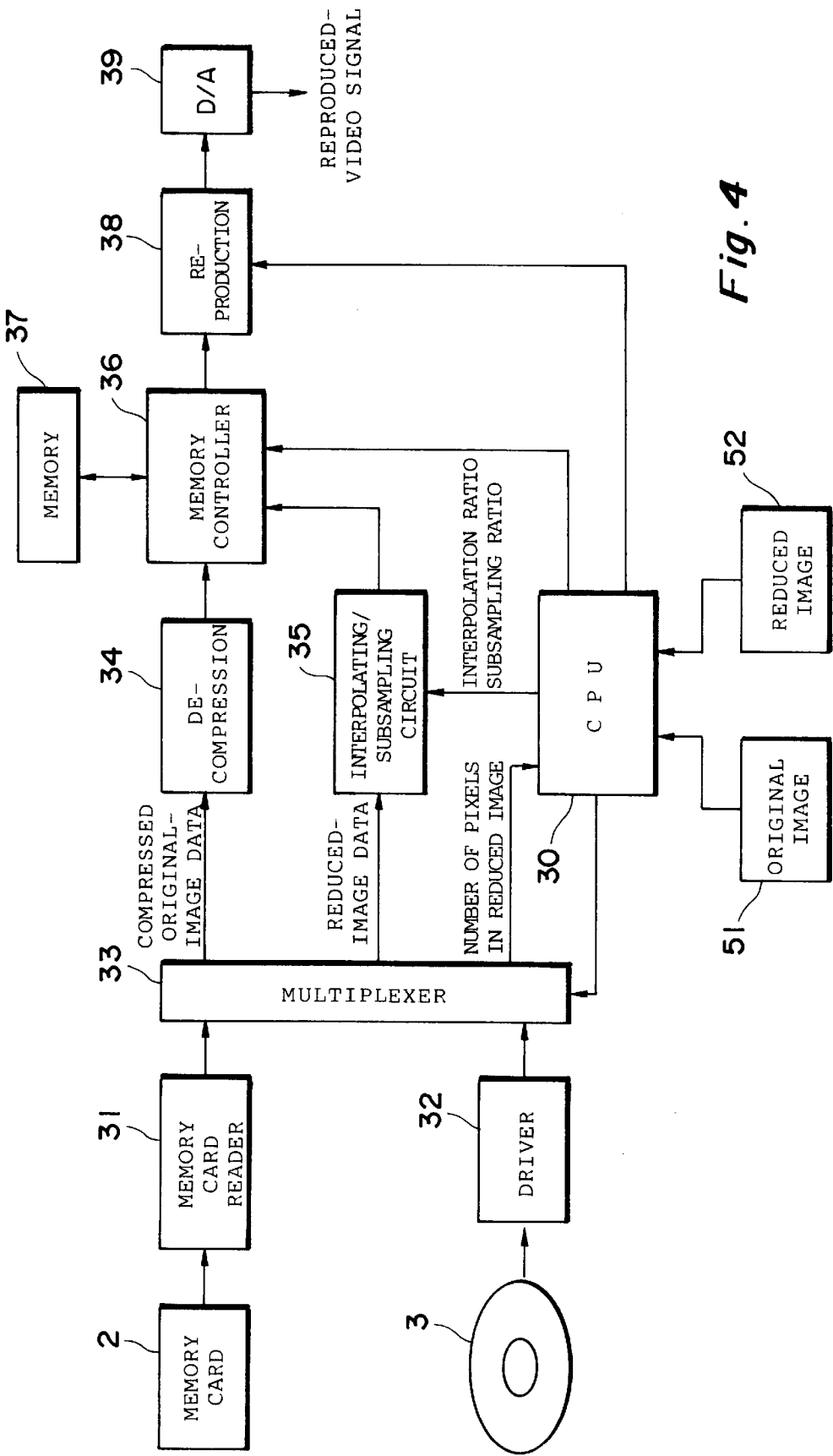
FIG. 4 is a block diagram illustrating the electrical configuration of an apparatus for reproducing image data.

FIG. 4 is a block diagram illustrating the electrical configuration of an apparatus for reproducing image data recorded using the image-data recording apparatus shown in FIG. 1.

The image-data reproducing apparatus shown in FIG. 4 is capable of reproducing both the image data recorded on the memory card 2 and the image data recorded on the magneto-optical disk 3. The overall operation of the image-data reproducing apparatus is supervised by a CPU 30.

The image-data reproducing apparatus shown in FIG. 4 is capable of reproducing original-image data representing an original image and reduced-image data representing a reduced image.

The image-data reproducing apparatus is provided with original-image reproduction setting button 51 for setting reproduction of the original-image data, and with reduced-image reproduction setting button 52 for setting reproduction of the reduced-image data. Signals indicating depression of the buttons 51 and 52 are applied to the CPU 30. Regardless of whether the original-image data or reduced-image data are reproduced, the button 51 or 52 is pressed after the desired number of frames has been designated.

In a case where image data that have been recorded on the memory card 2 are to be reproduced, the memory card 2 is loaded in the memory card reader 31. If image data that have been recorded on the magneto-optical disk 3 are to be reproduced, the magneto-optical disk 3 is loaded in the driver 32. Image data, header data and other data read out by the memory card reader 31 and driver 32 are applied to a multiplexer 33. The latter, under the control of the CPU 30, selects the data to be outputted. Of the data outputted by the multiplexer 33, the compressed original-image data are applied to a decompression circuit 34, the reduced-image data are applied to an interpolating/sampling circuit 35 and the data representing the number of pixels in the reduced image area applied to the CPU 30.

The decompression circuit 34 decompresses the compressed original-image data applied thereto. The original-image data outputted by the decompression circuit 34 are applied to a memory controller 36, which proceeds to temporarily store the data in a memory 37. The original-image data are read out of the memory 37 and applied to a reproducing circuit 38. The latter executes reproduction processing, which includes processing for generating R (red), G (green) and B (blue) color data, and outputs the color data. The image data outputted by the reproducing circuit 38 are applied to a digital/analog converting circuit 39, whereby the data are converted to an analog video signal. The analog video signal outputted by the digital/analog converting circuit 39 is outputted as a reproduced video signal. The original image is displayed by applying this reproduced video signal to a display unit.

The size of the reduced image, which depends upon the size of the original image and the coarseness thereof, is not fixed. However, it is required that all reduced images obtained be coordinated to have a uniform size. Since the size of a reduced image is represented by the numbers of pixels of the reduced image in the horizontal and vertical directions thereof, it is required that the numbers of pixels of the reduced image in its horizontal and vertical directions be made constant in order to obtain a uniform size for the reduced images.

In the image-data reproducing apparatus shown in FIG. 4, the data representing the numbers of the pixels of the reduced image in its horizontal and vertical directions is supplied from the multiplexer 33 to the CPU 30 and it is determined on the basis of the data representing these numbers of pixels whether the reduced image represented by the reduced-image data read from the recording medium has attained a predetermined, fixed size. If it is determined that the reduced image has taken on the predetermined, fixed size, then the reduced-image data outputted by the multiplexer 33 is applied to the memory controller 36 upon merely passing through the interpolating/sampling circuit 35 without undergoing image-data interpolation processing or subsampling processing. If it is determined that the reduced image has not taken on the predetermined, fixed size, the reduced-image data are applied to interpolation processing or subsampling processing in such a manner that the predetermined, fixed size is attained. If it is determined that the reduced image has a size smaller than the predetermined, fixed size, an interpolation ratio is decided by the CPU 30 in such a manner that the predetermined, fixed size will be attained, and the interpolation ratio is applied to the interpolating/sampling circuit 35. If it is determined that the reduced image has a size larger than the predetermined, fixed size, a reduction ratio is decided by the CPU 30 in such a manner that the predetermined, fixed size will be attained, and the reduction ratio is applied to the interpolating/subsampling circuit 35. The latter subjects the reduced-image data to subsampling processing or interpolation processing in accordance with the interpolation ratio or subsampling ratio provided by the CPU 30. In any case, the reduced image represented by the reduced-image data outputted by the interpolating/subsampling circuit 35 will have the predetermined, fixed size.

The reduced-image data outputted by the interpolating/subsampling circuit 35 are applied to the memory 37 via the memory controller 36, whereby the data are temporarily stored. Under the control of the memory controller 36, the reduced-image data are read out of the memory 37 and applied to the reproducing circuit 38. The reduced-image data subjected to reproduction processing in the reproducing circuit 38 are converted to an analog video signal by a digital/analog converting circuit 39. The analog video signal is outputted by the image-data reproducing apparatus as a reproduced video signal. This video signal is applied to the display unit to display a reduced image having the predetermined, fixed size.

Figure 5:
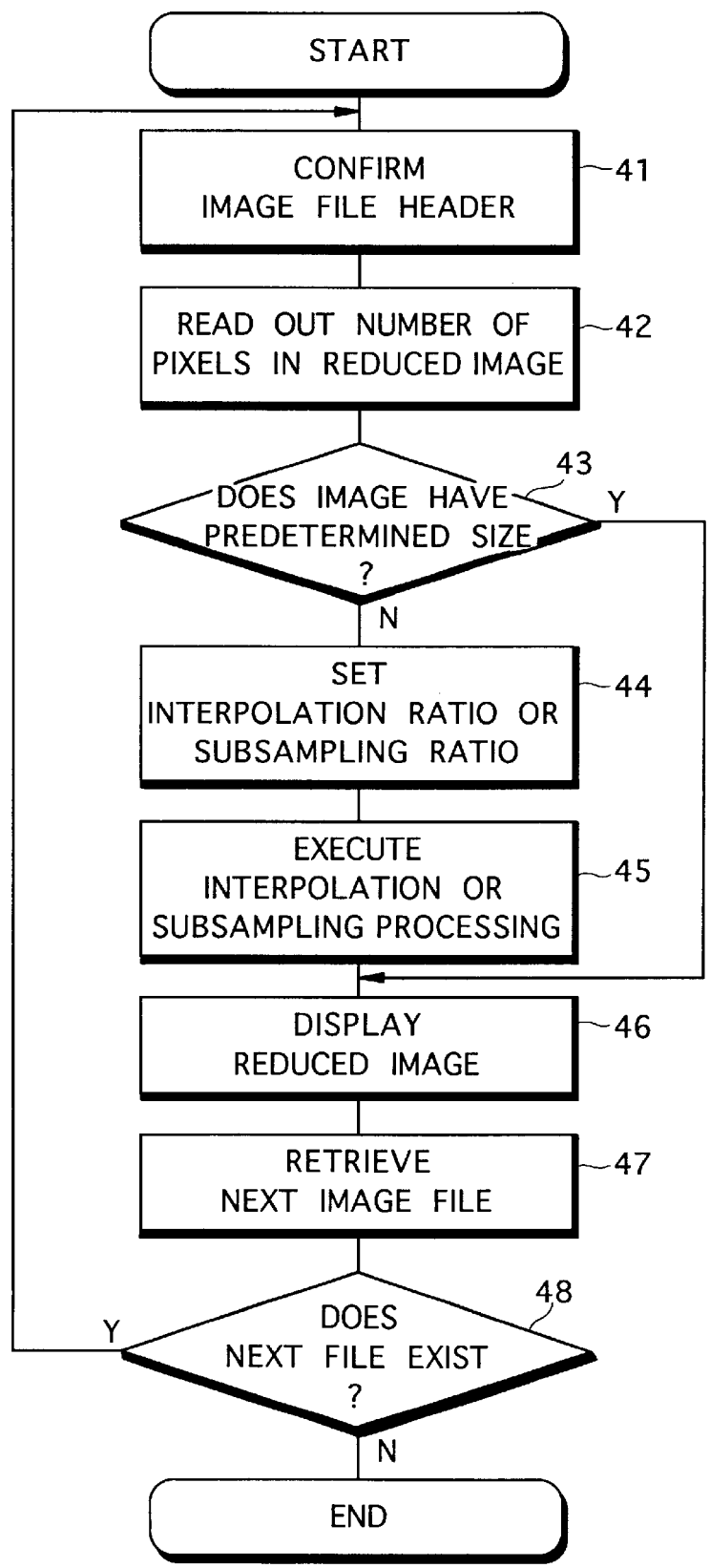
FIG. 5 is a flowchart illustrating the procedure of processing for reproducing a reduced image.

FIG. 5 is a flowchart illustrating the procedure of processing for reproducing a reduced image.

When the recording medium (the memory card 2 or magneto-optical disk 3) is loaded in the image-data reproducing apparatus and the reduced-image button 52 is pressed, the image file header that has been recorded in the header area of the loaded recording medium is read (step 41). By reading the data that have been recorded in the image file header, it is possible to determine in which cluster the data representing the number of pixels in the reduced image, the reduced-image data, the original-image data and other data have been recorded and thereby the necessary data can be read.

When the data that have been recorded in the image file header are read, the data representing the numbers of pixels in the horizontal and vertical directions of the reduced image are read based upon the data in the read image file header, and the data are applied to the CPU 30 (steps 41, 42). On the basis of the data representing the numbers of pixels in the horizontal and vertical directions, it is determined whether the reduced image represented by the reduced-image data has a predetermined size (step 43).

If it is determined that the reduced image has the predetermined size ("YES" at step 43), the reduced-image data read from the recording medium and outputted by the multiplexer 33 are merely passed through the interpolating/subsampling circuit 35. The reduced-image data that have passed through the interpolating/subsampling circuit 35 are subjected to reproduction processing and the reduced image is displayed (step 46). When the reduced image are displayed, the next image file is retrieved (step 47). If this image file exists, the processing of steps 41–47 is repeated (step 48).

When it is determined that the reduced image has not taken on the predetermined size ("NO" at step 43), an interpolation ratio or subsampling ratio is set (step 44) in such a manner that the reduced image represented by the reduced-image data will take on the predetermined size of the reduced image by being subjected to interpolation processing or subsampling processing. Interpolation processing or subsamplingout processing of the reduced-image data is executed (step 45) in the interpolating/subsampling circuit 35 based upon the set interpolation ratio or subsampling ratio. As a result, the reduced image representing the reduced-image data outputted by the interpolating/subsampling circuit 35 takes on the predetermined, fixed size.

Of particular importance is the fact that the numbers of pixels of the reduced image in its horizontal and vertical directions and the reduced-image data are recorded in the header area (the image-data management information recording area). As a result, the reduced image can be displayed merely by reading the data that have been recorded in the header area. This means that reduced images can be displayed quickly. In addition, the sizes of the reduced images can be made uniform irrespective of the quantity of original-image data or the quantity of the reduced-image data.

As many apparently widely different embodiments of the present invention can be made without departing from the spirit and scope thereof, it is to be understood that the invention is not limited to the specific embodiments thereof except as defined in the appended claims.

What is claimed is:

1. A method of recording and reproducing image data, comprising the steps of:

generating, from original-image data representing an original image, reduced-image data representing a reduced image of the original image, wherein said reduced-image data are generated based upon a prescribed reduction ratio;

recording the generated reduced-image data and corresponding original-image data on the recording medium in mutually correlated form;

calculating a quantity of reduced-image data;

recording data representing the calculated quantity of reduced-image data on the recording medium in correlation with the corresponding reduced-image data;

reading the recorded data representing the quantity of reduced-image data and said reduced-image data from the recording medium in response to a reduced-image output command and adjusting the quantity of reduced-image data, on the basis of the data representing the quantity of reduced-image data, such that the reduced image represents an image having a predetermined size; and outputting the reduced-image data, the quantity of which has been adjusted.

2. An apparatus for recording image data, comprising:

reduced-image data generating means for generating, from original-image data representing an original image, reduced-image data representing a reduced image of the original image, wherein said reduced-image data are generated based upon a prescribed reduction ratio;

first recording control means for recording the reduced-image data generated by said reduced-image data generating means and said original-image data on the recording medium in mutually correlated form;

reduced-image data quantity calculating means for calculating a quantity of reduced-image data generated by said reduced-image data generating means; and second recording control means for recording data representing the quantity of reduced-image data, calculated by said reduced-image data quantity calculating means, on the recording medium in correlation with the corresponding reduced-image.

3. The apparatus according to claim 2, further comprising:

reduction-ratio changing means for changing the reduction ratio, set in said reduced-image data generating means;

recording capacity calculating means for calculating recording capacity of the recording medium;

determination means for determining whether the recording capacity calculated by said recording capacity calculating means is greater than a predetermined threshold value; and means, responsive to a determination by said determination means that the recording capacity is greater than the predetermined threshold value, for changing the reduction ratio by controlling said reduction-ratio changing means such that said reduced image assumes a predetermined size.

4. A method of recording image data, comprising the steps of:

generating, from original-image data representing an original image, reduced-image data representing a reduced image of the original image, wherein said reduced-image data are generated based upon a prescribed reduction ratio;

recording the generated reduced-image data and corresponding original-image data on the recording medium in mutually correlated form;

calculating a quantity of reduced-image data generated; and recording data representing the calculated quantity of reduced-image data on the recording medium in correlation with the corresponding reduced-image data.

5. The method according to claim 4, further comprising the steps of:

enabling the prescribed reduction ratio to be changed;

calculating a recording capacity of the recording medium;

determining whether the calculated recording capacity is greater than a predetermined threshold value; and changing the reduction ratio, in response to a determination that the recording capacity is greater than the predetermined threshold value, such that said reduced image assumes a predetermined size.

* * * * *